United States Patent
Curry

[15] 3,659,867
[45] May 2, 1972

[54] FOLDABLE TOW-WHEEL DOLLY

[72] Inventor: Walter John Curry, 337 Roberta Street, Winnipeg 15, Manitoba, Canada

[22] Filed: Oct. 1, 1970

[21] Appl. No.: 77,099

[52] U.S. Cl. ...................... 280/36 C, 280/40, 280/47.27
[51] Int. Cl. .................................................. B02b 11/00
[58] Field of Search ............... 280/36 C, 36 R, 47.26, 47.27, 280/39, 40

[56] References Cited

UNITED STATES PATENTS

| | | |
|---|---|---|
| 2,782,047 | 2/1957 | Moran ................................ 280/36 C |
| 2,767,996 | 10/1956 | Seyforth .......................... 280/47.26 |
| 2,600,611 | 6/1952 | Bevington ......................... 280/36 C |
| 2,472,407 | 6/1949 | David ................................ 280/36 C |

Primary Examiner—Benjamin Hersh
Assistant Examiner—Robert R. Song
Attorney—Kent & Ade

[57] ABSTRACT

The handles are turned out and the wheels move from the stored position to the wheeling or operating position and vice versa. A bar is depressed which lowers the load plate and the bar also engaged studs on the wheel forks to lock the wheels open and the plate down.

3 Claims, 2 Drawing Figures

Patented May 2, 1972
3,659,867
2 Sheets-Sheet 1
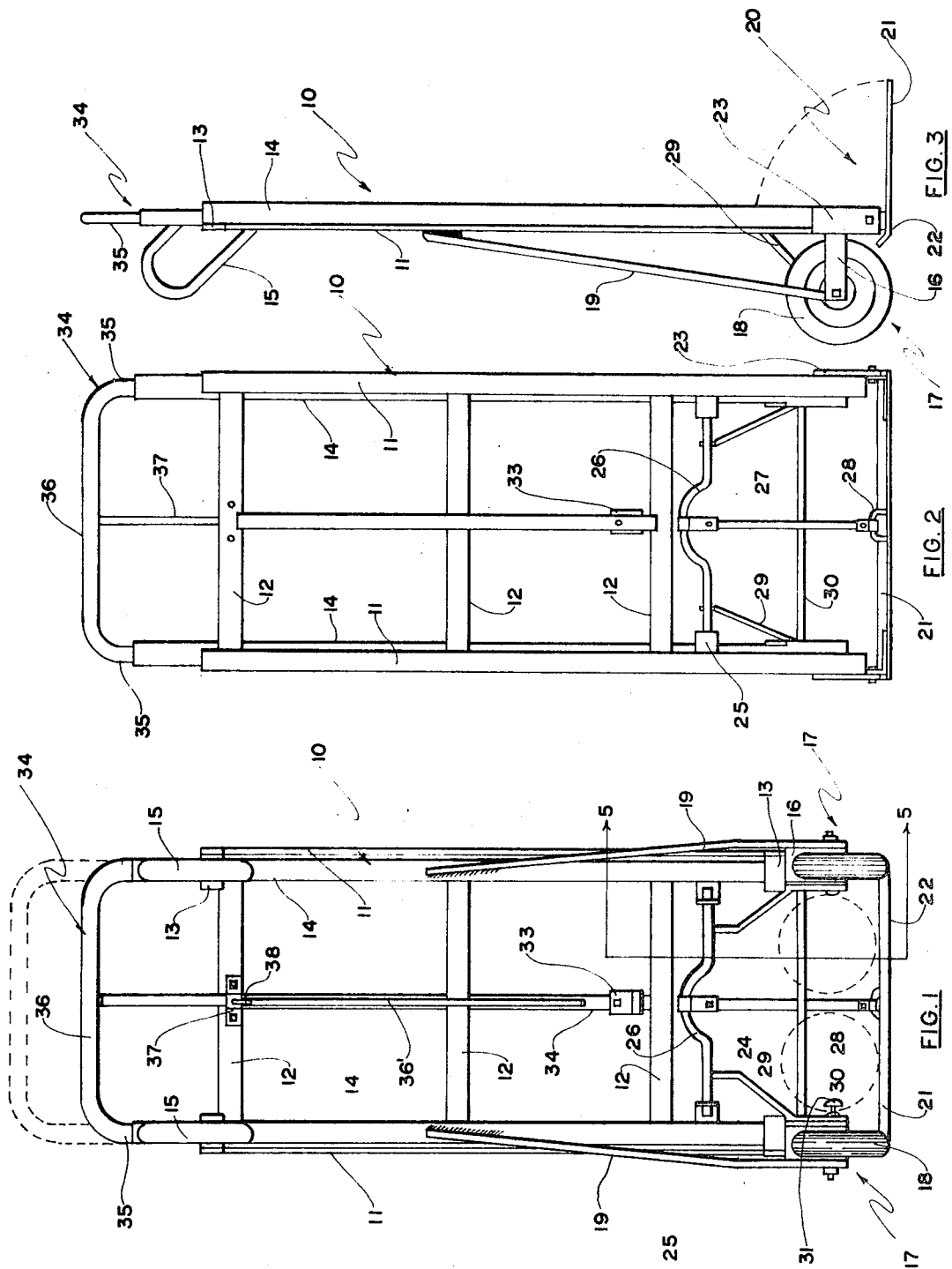
INVENTOR
WALTER JOHN CURRY
BY
ATTORNEY

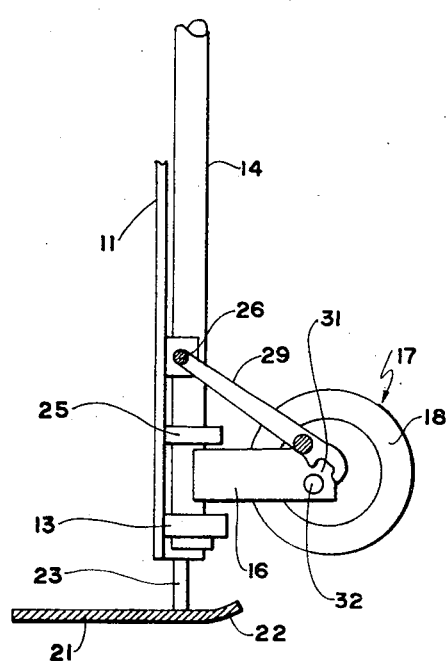
FIG. 5
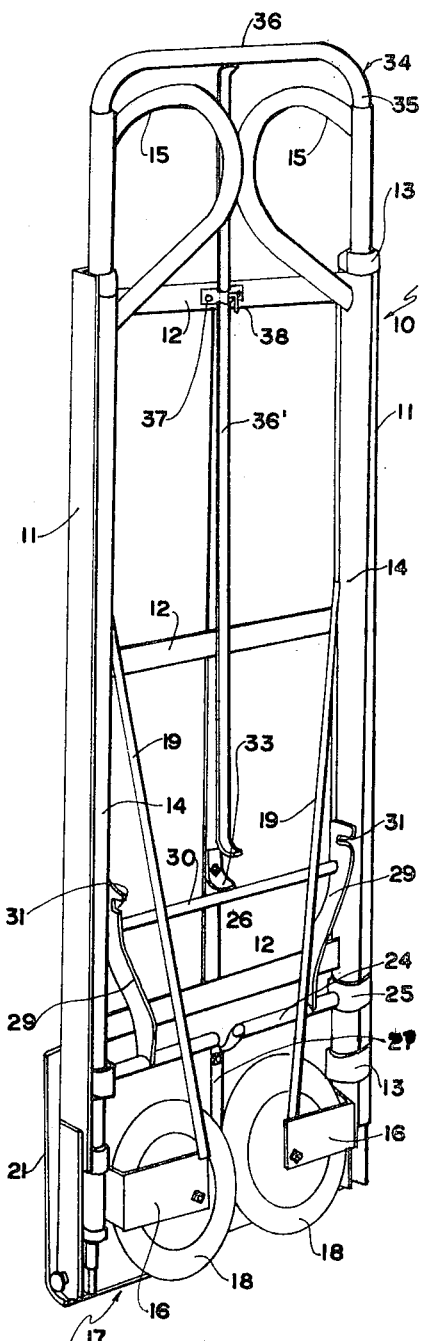
FIG. 6
FIG. 4
INVENTOR.
WALTER JOHN CURRY
BY
Kent & Ade
ATTORNEY

FOLDABLE TOW-WHEEL DOLLY

This invention relates to new and useful improvements in load carrying dollys which consist of a pair of handles, a frame and a load plate upon which items of merchandise may be engaged, the frame then being tipped rearwardly so that the plate clears the ground so that the dolly can be wheeled on the two wheels. Conventionally these are straight forward in manufacture and do not include means for folding same for storage and transportation purposes and it will be appreciated that storage and transportation of a relatively large number of these dollys creates certain difficulties.

The present invention overcomes these disadvantages by providing a pair of operating members having handles at one end and wheels at the other end so that when the handles are turned inwardly, the wheels also turn inwardly to lie in the same plane as the frame. At the same time means are provided to pivot the load plate upwardly so that it also lies flush with the frame thus presenting an extremely compact package for storing and transportation purposes.

A further advantage of the present invention is that means are provided so that when the load plate is lowered by a foot bar, and the wheels are opened to the operating position, means on the foot bar engage with studs on the wheel assemblies thus locking the plate down and the wheels open to make an extremely rigid and strong dolly assembly.

Another object of the invention is to provide a device of the character herewithin described which includes an extension for the frame so that bulky packages can be carried if desired, this extension telescopically engaging the tubes to which the handles are attached and being capable of being extended or retracted within limits and locked in any position between the fully extended and fully retracted positions.

A still further object of the invention is to provide a device of the character herewithin described which is simple in construction, economical in manufacture, and otherwise well suited to the purpose for which it is designed.

With the foregoing in view, and such other or further purposes, advantages or novel features as may become apparent from consideration of this disclosure and specification, the present invention consists of, and is hereby claimed to reside in, the inventive concept which is comprised, embodied, embraced, or included in the method, process, construction, composition, arrangement or combination of parts, or new use of any of the foregoing, of which concept, one or more specific embodiments of same are herein exemplified as illustrative only of such concept, reference being had to the accompanying Figures in which:

FIG. 1 is a rear elevation of the device in the operating position.

FIG. 2 is a front elevation of the device in the operating position.

FIG. 3 is a side elevation of the device in the operating position.

FIG. 4 is a rear view of the device in the folded position.

FIG. 5 is an enlarged fragmentary view substantially along the line 5—5 of FIG. 1.

FIG. 6 is an isometric view of the load carrying plate assembly per se.

In the drawings like characters of reference indicate corresponding parts in the different figures.

Proceeding therefore to describe the invention in detail, reference should be made to the accompanying drawings in which 10 illustrates a substantially rectangular frame including a pair of spaced and parallel longitudinal members 11, preferably made of angle iron, and a plurality of transverse members 12 extending therebetween as clearly shown.

Mounted adjacent the upper and lower ends of the longitudinal members are small cylinders or bearing sleeves 13 and engageable within these sleeves are a pair of operating members 14 one upon each side, said operating members preferably being tubular and hollow.

Handles 15 are secured adjacent the upper ends of each of said operating member and extend therefrom as clearly shown in FIG. 3.

A wheel fork 16 forming part of a wheel assembly collectively designated 17, is secured adjacent the lower end of each operating member and extends therefrom in the same direction as handles 15 also as clearly shown in FIG. 3. Ground engaging wheels 18 are journalled for rotation within each of the wheel forks and a diagonal brace member 19 extends from the fork upwardly to be secured to the operating members 14 intermediate the ends thereof.

From the foregoing, it will be appreciated that the fact that the operating members 14 are journalled within the sleeves 13, will permit the operating members to be rotated by means of handles 15 carrying with them, the wheel assemblies 17. When in the operating position, the handles extend substantially at right angles from the frame 10 as do the wheel assemblies 17. However, when the handles are turned inwardly, both the handles and the wheels lie flush with the frame and substantially in the same plane thereof as shown in FIG. 4.

A load plate assembly collectively designated 20 includes a substantially rectangular load carrying plate 21 pivoted by adjacent the rear edge 22 thereof to the lower ends of the frame longitudinals 11, braces 23 being welded to these lower ends for the purpose of strengthening this particular portion of the assembly.

The plate is capable of being moved from the operating position shown in FIG. 3 wherein it is substantially at right angles to the frame 10, to a stored position shown in FIG. 4 under which circumstances it is lying flush with the frame and substantially in the same plane thereof.

Means are provided to move this foot plate from one position to the other and take the form of a crank arm or rod 24 pivoted between brackets 25 secured towards the lower ends of the longitudinals 11 of the frame 10 with the crank portion 26 being substantially centrally of the crank rod 24.

A link 27 is pivotally secured by the upper end thereof to the crank portion 26 and by the lower end thereof to a loop 28 secured just inboard of the rear edge of the load plate 21 and centrally thereof.

Further means are provided and take the form of a pair of offstanding supports 29 one upon each side of the crank portion 26 and being secured to the crank arm or rod 24 as by welding or the like.

A foot rod or bar 30 extends between the outer ends of the offstanding supports 29 and it should also be observed that notches 31 are formed on the underside edges of each of the offstanding supports adjacent the outer ends thereof.

A pair of studs 32 extend one each from the wheel forks 16 and these studs are engageable by the notches 31 when the wheels and the load plate are in the operating position shown in FIG. 1, 2 and 3.

A spring clip 33 is secured to a central vertical support member 34 on the frame 10 and the foot bar or rod 30 engages under this spring clip when the device is in the stored position shown in FIG. 4.

An extension member collectively designated 34 consists of a pair of spaced and parallel rods or members 35 each of which is telescopically engageable within the upper ends of the operating members 14 and a cross bar 36 spans the upper ends of these rods 35 as clearly shown. A guide and locking member 37 extends downwardly from the cross bar 36 and engages between a clip 37 and one transverse member 12 of the frame with a screw or locking bolt 38 engageable with the clip 37. By loosening the locking bolt 38, the extension member may be moved upwardly as shown in phantom in FIG. 1 to any position governed by the length of the rods 35 and may be locked in this position to extend the operating characteristics of the device.

In operation, and assuming that the device is in the folded position shown in FIG. 4, the handles are grasped and turned outwardly to the position shown in FIGS. 1, 2 and 3 which also moves the wheels outwardly at the same time.

The foot bar or rod 30 is disengaged from the spring clip 33 by the foot of the operator, and is moved downwardly to the position shown in FIGS. 1, 2 and 3 which lowers the load plate to the operating position and engages the notches 31 with the studs 32 thus locking the assembly in the operating position and forming a rigid and firm structure.

Various modifications can be made within the scope of the inventive concept which is herein disclosed and/or claimed.

What I claim as my invention is:

1. A wheeled dolly comprising in combination a substantially rectangular frame, a pair of operating members, one on each side of said frame and being pivotally supported on the longitudinal edges of said frame and having a pivot axis parallel to said longitudinal edges, a handle on the upper end of each operating member extending at an angle therefrom, a wheel assembly mounted for rotation on the lower end of each operating member, said wheel assembly including a wheel fork and a wheel journalled therein, a load plate pivoted by the rear edge thereof to adjacent the lower side of said frame, and means to raise and lower said load plate from the operating position to the stored position and vice versa, said means incorporating further means engageable with said wheel forks when in the operating position to lock said plate in said operating position and said wheels also in said operating position, said handles being adapted to be turned from an operating position extending substantially at right angles to said frame to a stored position inwardly of said frame and substantially in the same plane thereof, said wheels also being turned by said handles from an operating position substantially at right angles to said frame to a stored position inwardly of said frame and substantially in the same plane thereof, said means to raise and lower said load plate including a crank bar journalled transversely of said frame and a link pivotally connecting between said crank bar and adjacent the rear edge of said load plate.

2. The device according to claim 1, in which said further means includes offset supports on said crank bar, a foot bar extending between said offstanding supports in spaced and parallel relationship to said crank bar, means extending from said wheel assemblies and notches on said offstanding supports engageable with said last means when said wheels and said plate are in the operating position, downward movement of said foot bar lowering said plate and engaging said notches with said last means.

3. The device according to claim 1, which includes an extension member telescopically engaging said operating members and capable of being extended or retracted therefrom to increase or decrease the load carrying characteristics of said dolly, and means to lock said extension member in any position within limits.

* * * * *